United States Patent [19]

Stehle et al.

[11] Patent Number: 4,735,768

[45] Date of Patent: Apr. 5, 1988

[54] FUEL ROD FOR A NUCLEAR REACTOR FUEL ASSEMBLY

[75] Inventors: Heinz Stehle, Marloffstein; Eckard Steinberg, Erlangen; Hans Weidinger, Nuremberg, all of Fed. Rep. of Germany

[73] Assignee: Kraftwerk Union Aktiengesellschaft, Mühlheim, Fed. Rep. of Germany

[21] Appl. No.: 894,922

[22] Filed: Aug. 8, 1986

[30] Foreign Application Priority Data

Aug. 8, 1985 [DE] Fed. Rep. of Germany ....... 3528545

[51] Int. Cl.$^4$ .............................................. G21C 3/20
[52] U.S. Cl. .................... 376/417; 376/414; 376/416; 376/434
[58] Field of Search ............... 148/11.5 F, 133, 6.3; 376/417, 414, 416, 434, 413; 29/116 AD

[56] References Cited

U.S. PATENT DOCUMENTS

| | | | |
|---|---|---|---|
| 3,620,691 | 11/1971 | Rubel | 29/191 |
| 4,045,288 | 8/1977 | Armijo | 376/434 |
| 4,233,834 | 11/1980 | Matinlasi | 72/208 |
| 4,406,012 | 9/1983 | Gordon | 376/414 |
| 4,411,861 | 10/1983 | Steinberg | 376/417 |
| 4,473,410 | 9/1984 | Grubb | 376/417 |

FOREIGN PATENT DOCUMENTS

| | | |
|---|---|---|
| 1537960 | 7/1967 | France . |
| 2317372 | 6/1976 | France . |
| 2509510 | 1/1983 | France . |
| 2538940 | 7/1984 | France . |
| 53851 | 1/1984 | World Int. Prop. O. . |
| 387180 | 2/1959 | Switzerland . |

*Primary Examiner*—Donald P. Walsh
*Attorney, Agent, or Firm*—Herbert L. Lerner; Laurence A. Greenberg

[57] ABSTRACT

Fuel rod cladding tube having an inner tubular layer of a zirconium alloy with alloying components of 1.2 to 1.7% tin, 0.07 to 0.2% iron, 0.05 to 0.15% chromium, 0.03 to 0.08% nickel, 0.07 to 0.15% oxygen, with the sum of percentages of iron, chromium and nickel in the range of 0.18 to 0.38%; or with the alloying components 1.2 to 1.7% tin, 0.18 to 0.24% iron, 0.07 to 0.13% chromium, 0.10 to 0.16% oxygen, with the sum of percentages of iron and chromium in the range of 0.28 to 0.37%; and with the inner tubular layer having an outside surface layer of another zirconium alloy with a layer thickness of 5 to 20% of the cladding tube as well as with 0 to 1% iron as an alloying component and with at least one alloying component from the group of: vanadium with 0.1 to 1% by weight, platinum with 0.1 to 1% by weight, and copper with 1 to 3% by weight.

8 Claims, No Drawings

FUEL ROD FOR A NUCLEAR REACTOR FUEL ASSEMBLY

BACKGROUND OF THE INVENTION

1. Field of the Invention

The invention relates to a fuel rod for a nuclear reactor fuel assembly with nuclear fuel which is contained in a cladding tube which is formed of a zirconium alloy.

2. Description of the Prior Art

Such fuel rods are in common use. They are built into the frame of the nuclear reactor fuel assembly. This nuclear reactor fuel assembly is finally inserted into a nuclear reactor, in which it is cooled, for instance, with light water. In this nuclear reactor, the zirconium alloys of the cladding tubes have a relatively small capture cross section for thermal neutrons.

On the outside of the cladding tubes of the fuel rods, corrosion takes place during the operation in the nuclear reactor, which limits the ability of the nuclear reactor fuel assembly to dwell in the nuclear reactor time-wise. The usual dwelling times are three to four years.

SUMMARY OF THE INVENTION

It is an object of the invention to improve the dwelling time of such nuclear reactor fuel assemblies to prolong their insertion in the nuclear reactor.

With the foregoing and other objects in view, there is provided in accordance with the invention a fuel rod for a nuclear reactor fuel assembly with nuclear fuel which is contained in a cladding tube comprising an inner tubular layer formed of a zirconium alloy with alloying components based on the weight of the zirconium alloy of 1.2 to 1.7% tin, 0.07 to 0.2% iron, 0.05 to 0.15% chromium, 0.03 to 0.08% nickel, 0.07 to 0.15% oxygen, with the sum of percentages for the alloying components iron, chromium and nickel in the range of 0.18 to 0.38%; the combination therewith of a surface layer on the outside of the inner tubular layer of a second zirconium alloy with a layer thickness in the range of 5 to 20% of the total wall thickness of the cladding tube as well as with 0 to 1% by weight iron based on the second zirconium alloy as an alloying component and with at least one alloying component selected from the group consisting of vanadium, platinum and copper wherein the amounts by weight based on the second zirconium alloy are: vanadium—0.1 to 1%; platinum—0.1 to 1%; and copper—1 to 3%.

In accordance with the invention, there is provided a fuel rod for a nuclear reactor fuel assembly with nuclear fuel which is contained in a cladding tube comprising an inner tubular layer formed of a zirconium alloy with alloying components based on the weight of the zirconium alloy of 1.2 to 1.7% tin, 0.18 to 0.24% iron, 0.07 to 0.13% chromium, 0.10 to 0.16% oxygen, with the sum of percentages for the alloying components iron, and chromium in the range of 0.28 to 0.37%; the combination therewith of a surface layer on the outside of the inner tubular layer of a second zirconium alloy with a layer thickness in the range of 5 to 20% of the total wall thickness of the cladding tube as well as with 0 to 1% by weight iron based on the second zirconium alloy as an alloying component and with at least one alloying component selected from the group consisting of vanadium, platinum and copper wherein the amounts by weight based on the second zirconium alloy are: vanadium—0.1 to 1%; platinum—0.1 to 1%; and copper—1 to 3%.

Other features which are considered as characteristic for the invention are set forth in the appended claims.

Although the invention is illustrated and described herein as embodied in a fuel rod for a nuclear reactor fuel assembly, it is nevertheless not intended to be limited to the details shown, since various modifications may be made therein without departing from the spirit of the invention and within the scope and range of equivalents of the claims.

DESCRIPTION OF THE PREFERRED EMBODIMENTS

The invention is based on the insight that the zirconium alloy of which the surface layer on the outside of the cladding tube of this fuel rod consists, is more corrosion-resistant than the zirconium alloy of which the rest of the cladding tube consists. While furthermore, the capture cross section of vanadium, platinum and copper for thermal neutrons is relatively large and the three mentioned alloying components are present only in the relatively thin surface layer of the cladding tube, the absorption losses of thermal neutrons in the nuclear reactor due to the cladding tubes are nevertheless relatively small.

Tests in an autoclave showed that the rate of corrosion of a test specimen of a zirconium alloy with 0.5% by weight iron and 0.25% by weight vanadium as the alloying components in steam is only one-tenth of the corrosion rate of a test specimen of a zirconium alloy with the trade name Zircaloy 4 under the same conditions, which contains, besides the zirconium, 1.2 to 1.7% tin, 0.18 to 0.24% iron, 0.07 to 0.13% chromium and 0.1 to 0.16% oxygen as further alloying components and in which the sum of the percentages by weight of the alloying components iron and chromium is in the range from 0.28 to 0.37% by weight. The dwelling time of a nuclear reactor fuel assembly with fuel rods according to the invention in a nuclear reactor can therefore be at least one year longer than that of a nuclear reactor fuel assembly with fuel rods, the cladding tubes of which consist of Zircaloy 4.

In the manufacture of a cladding tube for a fuel rod according to the invention, one advantageously starts out with a tube blank which comprises an inner tube, for instance, of Zircaloy 4 and an outer tube placed on this inner tube, of the zirconium-vanadium-iron alloy with 0.5% by weight iron and 0.25% by weight vanadium. This tube blank is heated to a temperature in the range of 500° to 700° C. and is then extruded. In the process, a metallurgical compound between the two zirconium alloys results.

By subsequent pilger-rolling of the extruded body, the final cladding tube for the fuel rod is ultimately obtained, which can, for instance, have a diameter of 10.7 mm and a wall thickness of 0.72 mm. The surface layer of the vanadium-containing zirconium alloy cover the entire outside of this cladding tube and may be, for instance, 0.1 mm thick. A pilger-rolling mill is described, for instance, in U.S. Pat. No. 42 33 834.

The foregoing is a description corresponding, in substance, to German application P 35 28 545.1, dated Aug. 8, 1985, international priority of which is being claimed for the instant application and which is hereby made part of this application. Any material discrepancies between the foregoing specification and the specification of the aforementioned corresponding German application are to be resolved in favor of the latter.

We claim:

1. Fuel rod for a nuclear reactor fuel assembly with nuclear fuel which is contained in a cladding tube formed of a zirconium alloy with alloying components based on the weight of the zirconium alloy of 1.2 to 1.7% tin, 0.07 to 0.2% iron, 0.05 to 0.15% chromium, 0.03 to 0.08% nickel, 0.07 to 0.15% oxygen, with the sum of percentages for the alloying components iron, chromium and nickel in the range of 0.18 to 0.38%; and with a surface layer on the outside of the cladding tube formed of a second zirconium alloy with a layer thickness in the range of 5 to 20% of the total wall thickness of the cladding tube as well as with 0 to 1% by weight iron based on the second zirconium alloy as an alloying component and with at least one alloying component selected from the group consisting of vanadium, platinum and copper wherein the amounts by weight based on the second zirconium alloy are: vanadium—0.1 to 1%; platinum—0.1 to 1%; and copper—1 to 3%.

2. Fuel rod for a nuclear reactor fuel assembly with nuclear fuel which is contained in a cladding tube formed of a zirconium alloy with alloying components based on the weight of the zirconium alloy of 1.2 to 1.7% tin, 0.18 to 0.24% iron, 0.07 to 0.13% chromium, 0.10 to 0.16% oxygen, with the sum of percentages for the alloying components iron and chromium in the range of 0.28 to 0.37%; and with a surface layer on the outside of the cladding tube formed of a second zirconium alloy with a layer thickness in the range of 5 to 20% of the total wall thickness of the cladding tube as well as with 0 to 1% by weight iron based on the second zirconium alloy as an alloying component and with at least one alloying component selected from the group consisting of vanadium, platinum and copper wherein the amounts by weight based on the second zirconium alloy are: vanadium—0.1 to 1%; platinum—0.1 to 1%; and copper—1 to 3%.

3. Fuel rod according to claim 1, wherein the alloying component of the second zirconium alloy is vanadium in an amount of 0.1 to 1%.

4. Fuel rod according to claim 1, wherein the alloying component of the second zirconium alloy is platinum in an amount of 0.1 to 1%.

5. Fuel rod according to claim 1, wherein the alloying component of the second zirconium alloy is copper in an amount of 1 to 3%.

6. Fuel rod according to claim 2, wherein the alloying component of the second zirconium alloy is vanadium in an amount of 0.1 to 1%.

7. Fuel rod according to claim 2, wherein the alloying component of the second zirconium alloy is platinum in an amount of 0.1 to 1%.

8. Fuel rod according to claim 2, wherein the alloying component of the second zirconium alloy is copper in an amount of 1 to 3%.

* * * * *